Patented Nov. 13, 1923.

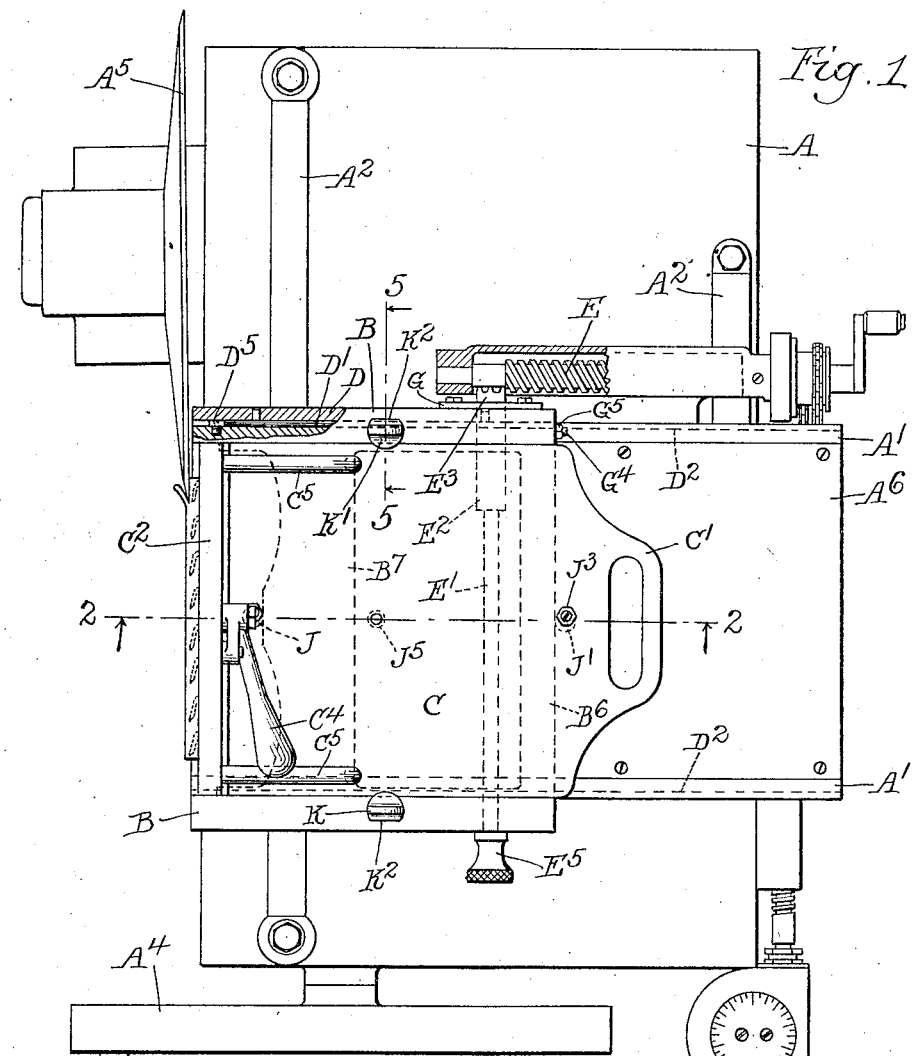

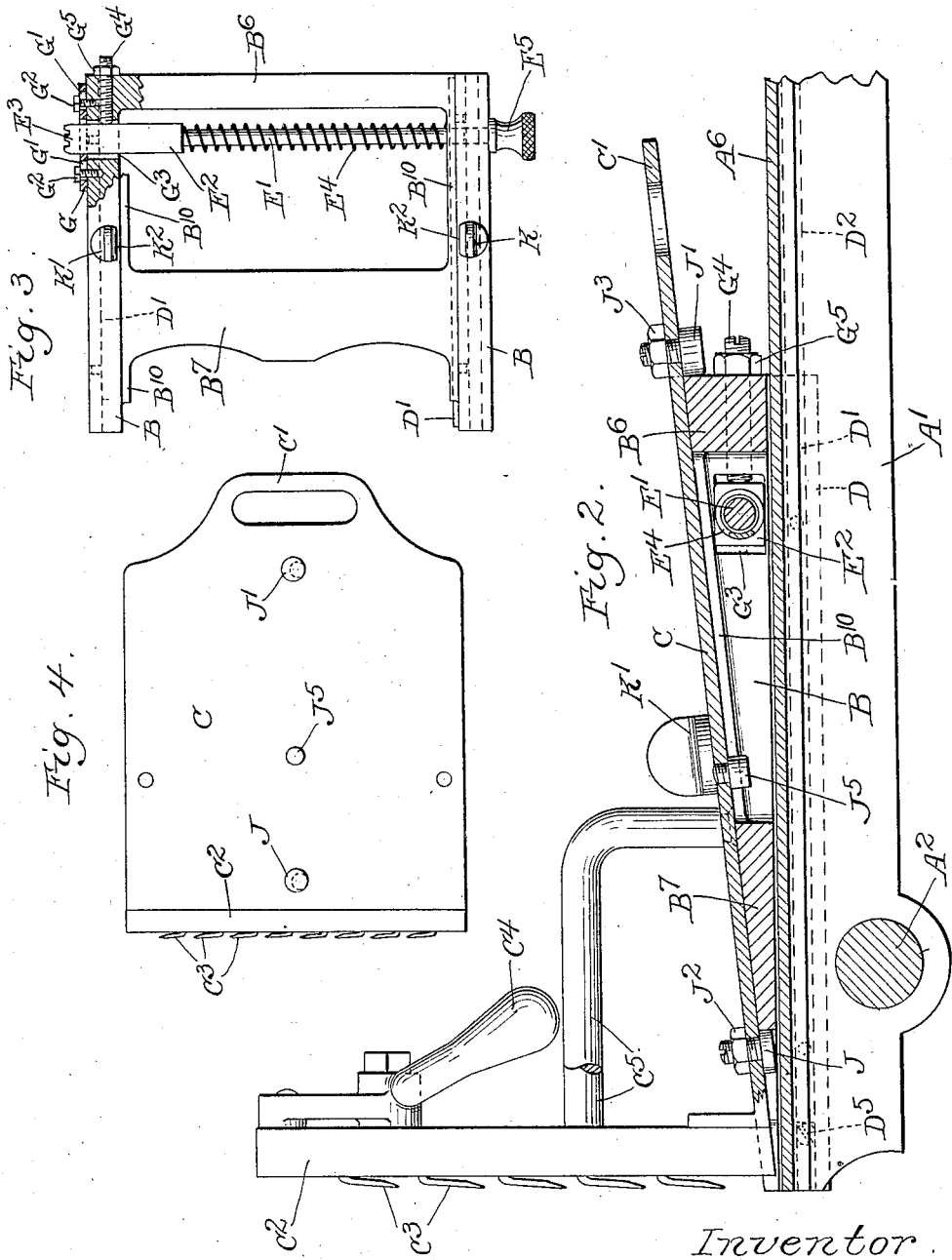

1,473,659

UNITED STATES PATENT OFFICE.

WALLACE B. WOLFF, OF CHICAGO, ILLINOIS.

SLICING MACHINE.

Application filed March 19, 1923. Serial No. 625,993.

*To all whom it may concern:*

Be it known that I, WALLACE B. WOLFF, a citizen of the United States, residing at Chicago, in the county of Cook and State of Illinois, have invented a certain new and useful Improvement in Slicing Machines, of which the following is a specification.

My invention relates to a meat slicing machine and particularly to a slicing machine of the type wherein a meat carrier is reciprocated back and forth past a circular rotating knife, the meat carrier proper being fed forward in the course of said reciprocation so that a slice of substantially uniform thickness is removed in the course of each reciprocation. It has for an object to provide means for insuring an even forward feeding of the meat carrier up to the extremity of its travel. It has for a further object to provide means for holding the meat so firmly in position that there will be no tendency for the rotation and curvature of the knife to draw the meat forward and to thus increase and make irregular the thickness of the slice. Other objects will appear from time to time in the course of the specication and claims.

I illustrate my invention more or less diagrammatically in the accompanying drawings wherein—

Figure 1 is a plan view;

Figure 2 is a section on an enlarged scale on line 2—2 in Figure 1;

Figure 3 is a plan view of the meat carrier, with parts in section;

Figure 4 is a plan view of the meat end plate shown in position in Figure 2;

Figure 5 is a section on line 5—5 of Figure 1; and

Figure 6 is a detail.

Like parts are indicated by like characters throughout the drawings and specification.

A is a slicing machine frame or supporting structure across which reciprocates the carriage $A^1$ which slides on the tracks or bars $A^2$ $A^2$. The carriage $A^1$ is adapted to reciprocate in response to the rotation of the drive wheel $A^4$ which is indicated as a hand wheel but which may be power driven. $A^5$ is a concave cutting disc adapted to rotate in response to rotation of the wheel $A^4$. $A^6$ is a surface plate connecting the two sides of the carriage $A^1$ and preferably providing a flush surface.

B is a forwardly inclined meat support adapted to slide along the carriage $A^1$, but out of contact with the upper surface of the plate $A^6$. Removably mounted on the support B is the meat plate C having a handle $C^1$. It is herein shown as provided at its outer end with the upwardly projecting meat engaging member $C^2$ in which are mounted the meat engaging hooks $C^3$ actuated in any suitable manner in response to the movement of the handle $C^4$, whereby they may be rotated to grip the meat. $C^5$, $C^5$ are braces or bars which steady the meat engaging member $C^2$ and hold it in uniform angular relation to the plate C and the inclined support B.

The plate C is supported upon the support B by means of the ledges $B^{10}$ which project from the side bars of which the support is composed, the upper surface of the plate being substantially flush with the upper surface of each side bar. The plate is locked in position by the rotating clamps K, $K^1$ which are cut away at one side as at $K^2$ to permit the insertion or removal of the plate and are provided with a beveled locking surface $K^3$. The plate C is shown thus locked in place in Figure 1.

The meat support B is provided with depending side portions D having inwardly projecting supporting ribs or flanges $D^1$ which engage and slide in the slots $D^2$ in the sides of the carriage $A^1$. At the forward extremity of the slot $D^2$ and positioned to limit the forward movement of the carriage B toward the knife $A^5$ is the stop $D^5$. The support B is moved forwardly across the carriage $A^1$ toward the knife $A^5$ in response to rotation of the spiral feed screw E which is driven by any suitable mechanism actuated by the reciprocation of the carriage $A^1$ across the frame A. The details of the rotating means form no part of the present invention and are merely diagrammatically illustrated, but it will be understood that the screw E is given an intermittent rotation in response to said reciprocation, thus feeding the support forward with a step by step motion.

Slidably mounted in the support B is the plunger $E^1$ which has a square end $E^2$ terminating in the feed nut $E^3$ which is normally held in mesh with the screw E by the compression spring $E^4$. At the opposite end of the plunger is the hand hold $E^5$ whereby the plunger may be manually withdrawn against the spring tension, to disengage the nut. The nut $E^3$ passes through the feed nut plate G, the aperture in which is of such size as to permit the square end $E^2$ of the plunger to pass therethrough with freedom and with a certain degree of play. This plate is slotted as at $G^1$, $G^1$ to permit a certain lateral movement in relation to the securing screws $G^2$, $G^2$, it being understood that the aperture $G^3$ through the carrier B is somewhat larger in diameter than the aperture in the feed nut plate. $G^4$ is an adjusting screw, screw threaded into the end of the support B and locked in position, as by the lock nut $G^5$. The inner end of the screw $G^4$ penetrates into the side of the aperture $G^3$, and contacts the square end of the plunger.

The support B has at its rear end the cross bar $B^6$ and at its front end the cross bar $B^7$. Mounted in the meat plate C are the two eccentric studs J, $J^1$ secured, as for example, by the lock nuts $J^2$, $J^3$. The axes of the eccentric studs are spaced apart by slightly more than the distance separating the forward edge of the cross bar $B^7$ and the rear edge of the cross bar $B^6$. Intermediate the two eccentric studs is the fixed stud $J^5$. The meat plate C can be placed in normal position and locked only when it is so positioned that the studs J and $J^5$ clear the cross bar $B^7$ and the stud $J^1$ clears the cross bar $B^6$. If the plate is positioned forward far enough to penetrate the cutting plane of a rotary knife, either $J^1$ will contact the top of the cross bar $B^6$ or if the plate is positioned still farther forward $J^5$ will contact the top of the cross bar $B^7$.

It will be realized that while I have illustrated a working mechanism, many changes might be made in the size, shape, number and disposition of parts without departing from the scope of my invention. Specifically, while I have illustrated my invention as applied to a meat end plate, it may also be applied to the usual type of flat meat plate used in cooperation with a clamp on the meat support.

The use and operation of my invention are as follows:

In the slicing machines heretofore used, the last slice is frequently thicker than is desirable or is uneven. In normal operation the feed nut escapes from the end of the feed screw, when the meat support reaches the limit of its travel toward the knife. It often happens, however, that when the nut escapes from the feed screw the meat support has not quite reached the limit of its possible travel. In such case the nut no longer exerts a locking action; the cupped or concave rotating knife draws the meat forward and cuts a slice which is thicker than the remaining slices of the series, and which increases in thickness from one side to the other of the slice, as the knife draws the meat forward. It will be realized that a very slight play is sufficient to result in a large or unusable slice, particularly when the slicing machine is set to cut very thin slices. To provide an adjustment sufficiently delicate to cope with this, I arrange to adjust the position of the nut $E^3$ along the side of the feed plate, while providing a fixed stop to limit the forward travel of the support. I accomplish this by double adjustment, first by lateral adjustment of the slotted feed nut plate G, and secondly by a movement of the adjusting screw $G^4$, the inner end of which engages the square end of the plunger $E^1$ and holds it against the opposite side of the plate G. To adjust the machine properly for a last slice uniform with the remaining slices, I press the feed plate forwardly against the stop $D^5$, and then adjust the plate G, to permit the nut $E^3$ just to escape from the feed screw E at the instant that the feed plate contacts and is stopped by the stop $D^5$. Therefore the knife cannot pull the feed plate forward after the nut leaves the screw, and a uniform slice will be cut.

The nut $E^3$ and the plunger upon which it is mounted are locked in position against the forward side of the plate G by the screw $G^4$ which is tightened sufficiently to prevent any lateral movement, but is not tight enough to prevent relatively free endwise movement of the plunger.

The above described adjustment is applicable both to the type of device herein shown in which the meat is secured to an end plate and to the usual feed plate in which the meat is clamped in place by a direct downward pressure and it will be understood that there is no intention to limit the application of the invention to the specific type herein shown, wherein the clamp has been omitted.

In the meat end plate of the general type herein shown, experience has shown a certain irregularity in the thickness of the slices, caused by give or spring in the meat end plate due to its improper adjustment or to its being loosely secured in place. I therefore provide means for obviating any possible play or looseness, and at the same time provide means for slightly adjusting the meat end plate along the support B. The plate C itself is locked in position on the feed plate B by the rotating clamps K, K¹. Lateral movement of the plate is of course prevented by the side bars of the carrier B. Longitudinal movement is prevented by the eccentric studs J, J¹ and longitudinal adjustment is obtained by adjusting either or both of said eccentric studs, in relation to the forward edge of the cross bar B⁷ and the rear edge of the cross bar B⁶. In order to prevent any possibility of the plate C being locked in place in such position that its forward edge projects sufficiently to contact the edge of the knife, I provide the stud J⁵ which will not permit the meat plate C to drop into locking position until it has cleared the rear edge of the cross bar B⁷. This is so proportioned that it will not be cleared by the stud J⁵ until the forward edge of the plate is withdrawn beyond the cutting line of the knife.

I claim:

1. In a slicing machine comprising a cutting element, a meat carriage adapted to be reciprocated thereacross, and a meat support adapted to be moved forwardly upon said carriage in response to its reciprocation, a spiral screw and means for rotating it in response to said reciprocation, a nut on said meat plate in mesh with said screw, and a stop on said carriage adapted to limit the forward movement of the support toward the knife, the length of the screw, the location of the stop and the position of the nut being such that when the support contacts the stop the nut leaves the forward end of the screw.

2. In a slicing machine comprising a cutting element, a meat carriage adapted to be reciprocated thereacross, and a meat support adapted to be moved forwardly upon said carriage in response to its reciprocation, a spiral screw and means for rotating it in response to said reciprocation, a nut on said meat plate in mesh with said screw, and a stop on said carriage adapted to limit the forward movement of the support toward the knife, and means for adjusting the position of said nut along said support.

3. In a slicing machine comprising a cutting element, a meat carriage adapted to be reciprocated thereacross, and a meat support adapted to be moved forwardly upon said carriage in response to its reciprocation, a spiral screw and means for rotating it in response to said reciprocation, a nut on said meat plate in mesh with said screw, and a stop on said carriage adapted to limit the forward movement of the support toward the knife, and means for adjusting the position of said nut along said support, comprising an adjustable bearing plate through which said nut passes.

4. In a slicing machine comprising a cutting element, a meat carriage adapted to be reciprocated thereacross, and a meat support adapted to be moved forwardly upon said carriage in response to its reciprocation, a spiral screw and means for rotating it in response to said reciprocation, a nut on said meat plate in mesh with said screw, and a stop on said carriage adapted to limit the forward movement of the support toward the knife, and means for adjusting the position of said nut along said support, comprising a nut engaging adjusting screw.

5. In a slicing machine comprising a cutting element, a meat carriage adapted to be reciprocated thereacross, and a meat support adapted to be moved forwardly upon said carriage in response to its reciprocation, a spiral screw and means for rotating it in response to said reciprocation, a nut on said meat plate in mesh with said screw, and a stop on said carriage adapted to limit the forward movement of the support toward the knife, and means for adjusting the position of said nut along said support, comprising an adjustable bearing plate, and a nut engaging screw adapted to hold said nut in fixed relation to said bearing plate.

6. In a slicing machine comprising a cutting element, a meat carriage and a meat support adapted to be moved forwardly upon said carriage, a meat carrying plate and means for longitudinally adjusting it upon said support.

7. In a slicing machine comprising a cutting element, a meat carriage and a meat support adapted to be moved forwardly upon said carriage, a meat carrying plate and means for longitudinally adjusting it upon said support, comprising a plurality of eccentric members mounted on said plate and adapted to engage each an opposed fixed element upon said carriage.

8. In a slicing machine comprising a cutting element, a meat carriage and a meat support adapted to be moved forwardly upon said carriage, a meat carrying plate and means for longitudinally adjusting it upon said carriage, comprising a plurality of eccentric members mounted on said plate and adapted to engage each an opposed fixed element upon said carriage and means for separately adjusting each of said eccentrics.

9. In a slicing machine comprising a cutting element, a meat carriage and a meat support adapted to be moved forwardly upon said carriage, a meat carrying plate, means for locking it in position upon said meat support, and means for preventing such locking when the plate is not properly positioned upon said support.

10. In a slicing machine comprising a cutting element, a meat carriage and a meat support adapted to be moved forwardly upon said carriage, a meat carrying plate, means for locking it in position upon said meat support, and means for preventing such locking when the plate is not properly positioned upon said support, comprising a member depending from the bottom of said plate and adapted to engage the top of said support when the plate is in improper position for locking.

11. Locking means for an integral meat end plate comprising a plurality of eccentric studs mounted on the bottom of said meat plate, opposed surfaces adapted to be gripped by said studs, and means for separately adjusting each of said studs.

Signed at Chicago, county of Cook, and State of Illinois, this 16th day of March, 1923.

WALLACE B. WOLFF.